SELECTIVE SIGNAL TRANSMITTING AND INDICATING SYSTEM

Filed Dec. 26, 1963 3 Sheets-Sheet 1

INVENTORS.
BILLY BURLEY
CHARLES F. STRAWN
BY
Andrus & Starke
ATTORNEYS

INVENTORS.
BILLY BURLEY
CHARLES F. STRAWN
BY
Andrus & Starke
ATTORNEYS

SELECTIVE SIGNAL TRANSMITTING AND INDICATING SYSTEM

Filed Dec. 26, 1963 3 Sheets-Sheet 3

INVENTORS.
BILLY BURLEY
CHARLES F. STRAWN
BY
Andrus & Starke
ATTORNEYS 3,402,404

SELECTIVE SIGNAL TRANSMITTING AND INDICATING SYSTEM

Billy Burley, Dallas, and Charles F. Strawn, Arlington, Tex., assignors to Johnson Service Company, Milwaukee, Wis., a corporation of Wisconsin Filed Dec. 26, 1963, Ser. No. 333,518
23 Claims. (Cl. 340—176)

ABSTRACT OF THE DISCLOSURE

A plurality of input electrical devices are paired with a plurality of output electrical devices. The paired devices are grouped in threes and in each group the input devices are connected at one end to a common point and the output devices are connected to a common point. Three transmission lines are provided each of which interconnects the common points of one of the groups. Three additional transmission lines interconnect one of each of the input devices of each group to the corresponding output devices of each group. A signal separating means or power device is provided in each of the last-named transmission lines. The separating devices can take the form of a sequentially connected power source or frequency oscillators. Each of the input devices and each of the output devices is connected in series with a diode or corresponding frequency sensitive device, depending upon the power source.

This invention relates to a signal or information transmitting system and particularly to such a system for transmitting of signals or information through a selected number of information channels with a minimum number of transmission lines.

Although the present invention is broadly directed to transmitting of information related to any desired functions between a plurality of related or paired locations which constitute individual information channels, it is particularly adapted to an electrically responsive condition monitoring or control system wherein certain dispersed operational means are to be controlled or monitored from a remote center. For example, a heating and air conditioning system for a building may advantageously include temperature sensing means such as temperature sensitive resistance elements dispersed throughout the building to provide electrical signals which are related to the temperature of the corresponding atmospheres. The signals can be transmitted to a central control center and actuate related or paired devices to provide an indication of the temperature conditions in the system for continuous supervision and monitoring of the air conditioning system. In other applications, it may be desirable to selectively control, either manually or automatically, various components such as a motor, a pump or other operational device from one or more remote control centers or locations. Although such control systems may include separate control wires between a control or monitoring center and the devices, an exceedingly large number of control or transmission wires are required. If common transmission wires are used, a great plurality of complicated discriminating systems including relays and the like have generally been required. Either system may be relatively costly, both for the initial installation and for subsequent servicing. Further, it is extremely difficult to anticipate expansion of the information transmittal system in an economical and practical manner.

The present invention is directed to an information transmitting system employing a relatively small number of transmission wires interconnecting paired locations in series information channels for individual transmission between the means at the respective locations. The paired locations are similarly grouped to share the transmission wires. First common transmission wires interconnect corresponding ends of the paired devices in the corresponding groups and second common wires connect the means at corresponding locations from each of the groups to complete loop or series circuits. Each device is connected in its branch in series with a unidirectional current means to isolate the devices in one direction. The devices in each group are thereby connected in parallel to the first common transmission wire with the individual circuits completed through different transmission wires which constitute control or discriminating lines. The information system of this invention is such that it can, for ease of discussion, be arranged as an array or a matrix of two groups of perpendicularly intersecting transmission lines with each of the intersections constituting a control or controlled point at which a device can be provided. One group of lines connects the connected devices into a corresponding number of groups and the other group of lines is connected to corresponding devices in the groups thereof. Two such matrix systems are provided with the corresponding transmission lines interconnected and with the related or corresponding locations in the matrices establishing series circuits to the paired input and output devices. A power source unit is inserted in one set of the paralleled transmission lines and the respective electrical devices are interconnected into the matrices in series with suitable unidirectional current means permitting current flow in accordance with the polarity of the power source unit. The unidirectional current devices eliminate undesirable current feedback or transfer of power between the paralleled conductors while allowing a controlled conduction from the power source lines to any one of the lines in the other group.

In accordance with the present invention, the transmission lines which interconnect the corresponding devices of the several groups are selectively or uniquely controlled to prevent circulating or feedback currents from one power source continuing back through a different group and energizing an erroneous or different electrical device than that of the related controlled line. Thus, with the devices interconnected in an arrangement which can be set forth in terms of a matrix, the power sources are interconnected through the respective paralleled circuits and the simultaneous completing of different information channels in two groups may provide a current path to a different information channel within the two groups with a resulting current supplied to the electrical device therein. In accordance with the present invention, the one set or group of lines is interconnected to provide discrimination or separation of the current to the paired devices. For example, a different current frequency may be transmitted by the several transmission lines connected to the corresponding devices of the several groups and appropriate filters provided to block the circulation of the currents between the several control or discriminating transmission lines. In accordance with the present invention, a unique means of providing power source separation includes the sequential closing of the control or discriminating transmission lines to provide time-spaced application of power to the related devices of the various groups defined by the common transmission group lines. Particularly novel and useful means for providing successive power application employs an electronic ring counter having a stage for each control transmission line with each stage employing a silicon controlled rectifier and pulsing transformer for sequential firing of the stages. A silicon controlled rectifier is an open switch or circuit element and conducts only when the anode is made positive with respect to the cathode. Further, a firing pulse must be simultaneously applied to the gate of the silicon controlled rectifier to initiate conduction. When the anode goes negative, the silicon controlled rectifier inherently cuts off and conduction stops. The circuit is arranged such that when the rectifier cuts off, the pulse transformer transmits a pulse to trigger the following stage. The counter therefore continuously and cyclically completes or closes each stage to provide a continuous cycling of power circuits through the associated transmission lines.

Further, in accordance with the present invention, an error detecting and counter reset circuit is provided. If more than one stage is in a conducting state within the ring counter, the reset circuit is triggered to stop and restart the counter. The electronic ring counter is a high speed, reliable and long life system which will provide for continuous cyclic and sequential application of power to the related elements of the several groups.

The present invention thus provides a plurality of transmission wires or connecting lines between grouped electrical devices or means wherein the transmission wires are uniquely time shared by the devices with respect to the signal transmission. The lines may be arranged in the form of two matrices with the paired electrical means at corresponding points in the two matrices. For any given number of wires, the most efficient utilization is made by having paired locations or information channels equal in number in both the rows and columns of the matrix.

The present invention can be employed in any information transmittal or retrieval system including an analogue system for providing a continuous indication or monitoring of a temperature, pressure, flow or other electrically responsive condition. The present invention particularly provides information interchange between a relatively large number of points with a relatively small number of wires and circuit components interconnected in a system which can be readily installed and serviced without unique or unusual skill or experience. This minimizes installation and maintenance costs and allows anticipation of future expansions. Further, the discriminating components and elements employed may be solid state units with corresponding advantages of ruggedness, compactness, long life and reliability.

The drawings furnished herewith illustrate various aspects and features obtained in the present invention and with the following description, will more fully explain the above and other advantages of the present invention.

Figure 1:
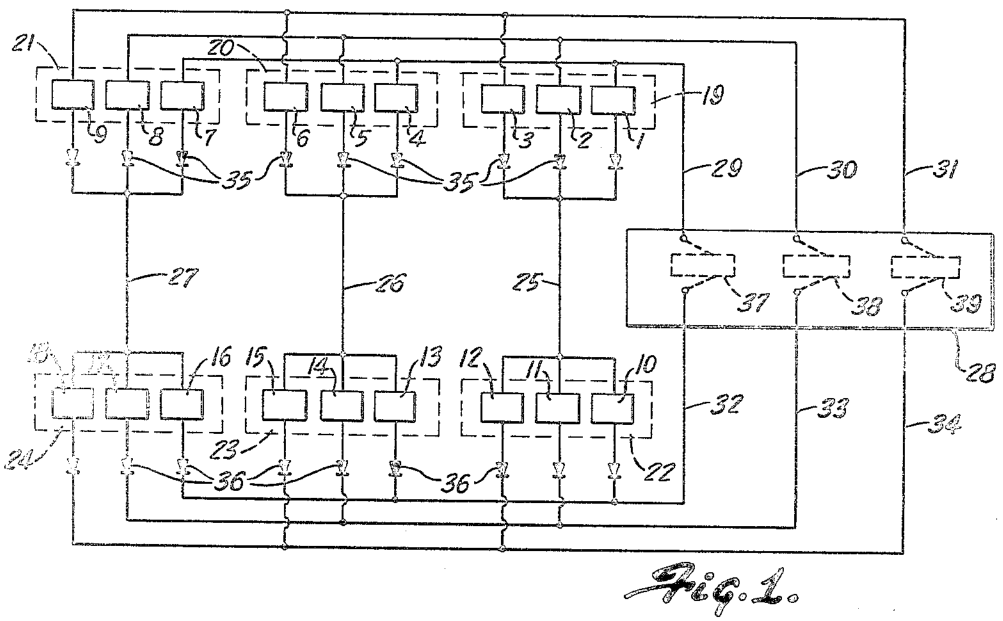
FIG. 1 is a simplified block diagram illustrating the present invention.

Referring to the drawings and particularly to FIG. 1, nine electrical devices 1–9 are shown by laterally spaced and correspondingly numbered blocks with a second series of nine electrical devices 10–18 similarly shown in vertically spaced and aligned relation. The electrical devices 1–9 are paired respectively with the electrical devices 10–18 to provide nine information channels with a requirement that an information bit or signal transmitted between device 1 and device 10, between device 2 and device 11, and so forth through paired devices 1 and 18 is not also transferred to any other pair. In FIG. 1, the electrical devices 1–9 are divided into three groups 19, 20 and 21 of three devices each. Group 19 consists of the devices 1 through 3; group 20 consists of devices 4 through 6; and group 21 consists of devices 7 through 9, inclusive. Devices 10 through 18 are divided into similar related groups 22, 23 and 24, respectively. Three common transmission lines 25, 26 and 27 are provided and interconnect the one end of the respective groups 19 and 22, 20 and 23, and 21 and 24. Thus, any signal transmitted between the paired devices of the respective groups is transmitted therebetween over the common transmission lines 25, 26 and 27. The circuit to each of the paired devices is completed by connecting the opposite sides of the devices 1–18, inclusive, through a power source unit 28, as follows. The one side of the power source 28 is connected to the groups 19 through 21 by three power leads or transmission lines 29 through 31, respectively, and the opposite side of the power source 28 is connected to the groups 22 through 24, inclusive, by three corresponding power leads or transmission lines 32 through 34. Each of the power lines 29–31 is connected to a corresponding device 1–9 in the related groups 19, 20 and 21 and, similarly, each of the lines 32–34 is connected to a corresponding device 10–18 in the related groups 22, 23 and 24. For example, lead 29 is connected to elements 1, 4 and 7 of groups 19, 20 and 21 and the associated power lead 32 is therefore connected to the corresponding elements or devices 10–13 and 16 of the related groups 22, 23 and 24. The circuit thus provides a plurality of power loops to the respective groups and to the respective devices within the groups.

Diodes 35 are connected within each group 19, 20 and 21 between the devices 1–9 and the common transmission lines 25, 26 and 27. Diodes 35 are shown poled to permit current flow to the connected transmission line 25, 26 or 27 and thereby prevent feedback of power or current from the one circuit to the opposite circuit. Thus, the diode 35 in series with devices 2 and 3 prevents a power path to the lead 20 or 31 from the lead 29.

Similarly, diodes 36 are inserted within each group 22, 23 and 24 in series with devices 10 through 18, inclusive, between the device and the connected power leads 32, 33 and 34. The diodes 36 prevent transmission of power from one group to the other groups. Thus, current through device 10 and the associated diode 36 can return to the power source 28 via lead 32 but cannot transfer power to the device 13 or 16 even though connected to the same power lead 32 as a result of blocking action of the diodes 36 in series with the devices 13 and 16, respectively.

Additionally, to prevent transfer of power between the power leads 29–34 from one group to another, unique discriminating means 37, 38 and 39 interconnect the respective power leads 29 and 32, 30 and 33 and 31 and 34. The function of means 37–39 can be clearly illustrated by an example which assumes their absence. For example, let the device 1–9 constitute normally open and selectively closed switches such that the information channels to the related devices 10–18 are normally open. If switch devices 1 and 5 are closed, the paired devices 10 and 14 should be energized. The circuit for device 10 can be traced from power source 28, lead 29 through device 1 and diode 35 of group 19, common transmission line 25, device 10 and associated diode 36 of group 22, and lead 32 back to the power source 28. Similarly, the circuit to device 14 controlled by device 5 may be traced from power source 28, lead 30, device 5 and diode 35 of group 20, common transmission line 26, device 14 and diode 36 of group 23, and lead 33 back to the power source 28. However, a complete circuit for the device 13 can also be traced even though the related switch device 4 has not been actuated, as follows. The circuit begins at source 28 and continues through lead 29, device 1 and the associated diode 35 of group 19, common transmission line 25, device 11 and associated diode 36 of group 22 to power lead 33, power source 28, lead 30, device 5 and associated diode 35 of group 20, common transmission line 26, device 13 and diode 36 of group 23, and lead 32 back to power source unit 28. Thus, device 13 would be energized or information transmitted thereto even though the related device 4 is maintained in the normal position. The three discriminating means 37–39 of this invention are interconnected or interrelated in a unique manner such that power flowing in any one of the discriminating transmission lines formed by the related leads cannot be operative in the circuit of the other discriminating lines. For example, devices 37, 38 and 39 can be frequency sensitive power sources including means to generate power of a predetermined frequency in combination with means passing only such frequency through the associated circuit. This will prevent any cross current flow between the circuits such as described above and as more discussed in connection with FIG. 6. A single power source, or separate individual power sources, can also be sequentially interconnected into the respective leads through a suitable sequencing switch means to permit use of a single frequency system while eliminating transfer of power as described above. The sequential application of power through the power source and discriminating unit would, for example, open the connection between lines 30 and 33 as long as power is being supplied from the first stage via lines 29 and 32 and thus break the circuit and interconnected current path between the several common control power lines for example as shown in the embodiment shown in FIGS. 2 and 5.

Figure 2:
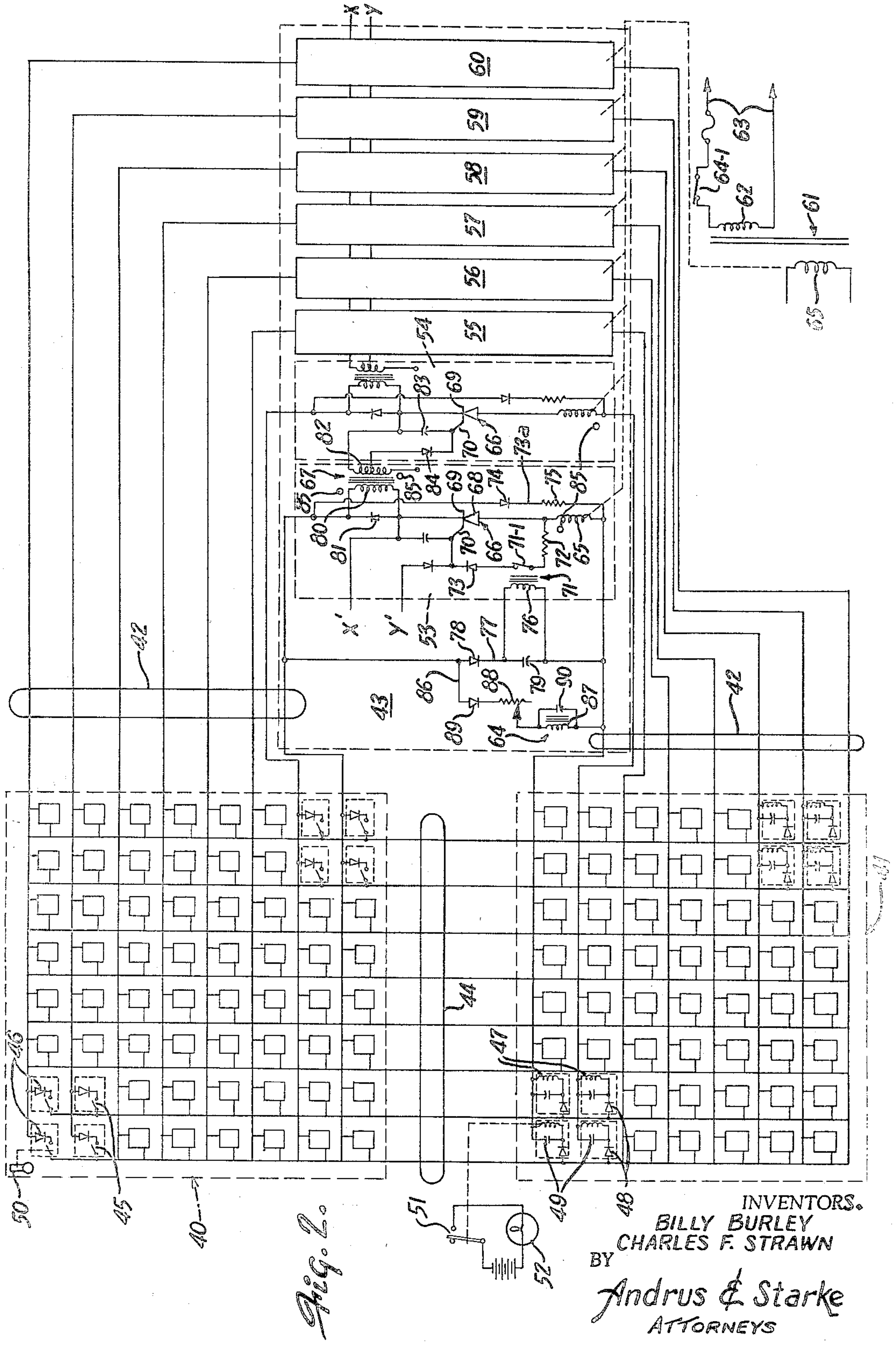
FIG. 2 is a schematic circuit diagram illustrating the present invention applied to transmitting information between sixty-four field points and a control center or the like and employing a unique ring counter to provide power source discrimination.

A particularly unique and satisfactory means for providing sequential power source connections is shown in the circuit of FIG. 2 which also illustrates the present invention with sixty-four paired locations or devices provided in contrast to the nine paired points illustrated in FIG. 1. The circuit of FIG. 2 illustrates the substantially greater number of locations or points which can be uniquely connected with minimization of wiring as a result of the present invention. The circuit of FIG. 2 also illustrates an improved sequencing means in the form of an electronic ring counter providing a highly reliable and long life means which sequentially completes the discriminating lines and therefore provides proper time sharing of the power lines by the respective elements or the control devices.

In FIG. 2, the respective devices, as hereinafter described, are shown arranged as a part of a field matrix 40 and a similar central matrix 41 of perpendicularly intersecting conductors. Each of the matrices 40 and 41 is composed of eight horizontal lines or conductors 42, with corresponding lines, beginning at the lower line of matrix 40 and the upper line of matrix 41, connected serially through a power source and discriminating unit 43; generally in the manner corresponding to the connection of lines 29 through 31 and lines 32 through 34, inclusive, of FIG. 1. Eight vertical signal transmission lines 44 form a common part of the matrices 40 and 41 and correspond generally to lines 25–27 of FIG. 1. The sixteen intersecting horizontal and vertical lines 42 and 44 of each matrix create sixty-four locations or points which may be paired to provide sixty-four information channels with the information in the channels maintained from the other channel. As in FIG. 1, the lines can be electrically connected by suitable electrical devices, with contacts or switches 45 shown at selected locations in the field matrix 40, for discussion purposes, and with the other locations being generally shown by simple blocks for clarity of illustration. The switches 45 are connected in series between intersecting horizontal and vertical lines 42 and 44 in series with individual diodes 46. The eight switches 45 shown in a vertical row and connected to a single vertical line 44 correspond to a group, for example group 21 of FIG. 1, wherein one side of each of the switches 45 is connected to a control or discriminating transmission line 42 and the opposite side of which is connected to the common signal transmission line 44. Thus, the input matrix defines eight groups corresponding generally to the three groups 19, 20, and 21 of FIG. 1.

The electrical devices shown in the central matrix 41 are relay coils 47 connected in series with diodes 48, corresponding to diodes 36 of FIG. 1, between the vertical or common transmission lines 44 and the horizontal or control transmission lines 42 at the respective points of intersection. The other locations are illustrated with simple connecting blocks to provide correspondence between matrices 40 and 41. Holding capacitors 49 are shown connected in parallel one with each of the relay coils 47 to maintain timed energization of the related relay coil 47 after an energizing pulse is supplied thereto, as more fully described hereinafter. Thus, each point of intersection in matrix 41, and each relay coil 47 provided thereat, corresponds to a switch 45 at the corresponding intersecting point of the field matrix 40. Generally, the circuit shown in FIG. 2 will function in the same manner as that described with respect to FIG. 1 the signal being transmitted or impressed on a relay coil 47 when the associated switch 45 is closed. The switches 45 may be manually or automatically closed in response to a predetermined condition. For example, as diagrammatically shown in association with one switch, a thermostat or other temperature sensing device 50 can be coupled to a switch 45 to automatically close the switch whenever a predetermined temperature condition exists. Similarly, the associated relay coil 47 may have a set of contacts 51 connected in an energizing circuit for a lamp 52 to visually indicate the closing of the corresponding switch 45. Obviously, any other suitable indicating or transmitting device may be substituted for lamp 52. The power is supplied through a closed switch 45 and the associated relay coil 47 from the power source and discriminating unit 43 which is shown in FIG. 2 as a solid state electronic ring counter.

Unit 43 includes eight similar stages 53 through 60, inclusive, which are inserted one each in the respective control or discriminating power lines 42 to the matrices 40 and 41. Each of the stages 53 through 60 is energized from a power transformer 61 having a primary winding 62 connected to an incoming alternating current power line 63 by a set of contacts 64–1 of a reset relay 64 which is connected in the output circuit of stafe 53. The transformer 61 includes eight secondary windings 65 connected one each in each of the stages 53 through 60, inclusive. Each stage of the unit 43 is similarly constructed and the first stage 53 is hereinafter described in detail with corresponding elements in the other stages referred to by similar numbers for purposes of simplicity and clarity of explanation.

Generally, stage 53 includes the secondary winding 65 of transformer 61 connected in series with a silicon controlled rectifier 66 and a pulse transformer 67 in the first stage discriminating line 42, shown as the top line in the matrix 41 and the bottom line in matrix 40.

The silicon controlled rectifier 66 is diagrammatically shown and includes an anode 68 and a cathode 69 serially connected in lead 42 and poled to conduct current from matrix 41 to matrix 40. A gate 70 controls the initiation of conduction between the anode 68 and the cathode 69. In a silicon controlled rectifier 66, the anode 68 must be positive with respect to the cathode 69 before conduction will occur. Further, a proper triggering pulse must be applied to the gate 70, during the period that the anode 68 is positive, to initiate conduction therethrough. Further, as soon as anode 68 becomes negative with respect to the cathode 69, the rectifier 66 cuts off and again constitutes as a normally open switch until the anode 68 is again made positive and a proper firing signal simultaneously applied to the gate 70.

In the present invention, only one of the silicon controlled rectifiers 66 is turned on at any one time as hereinafter described.

The first stage 53 includes an automatic start relay 71 having a set of normally closed contacts 71–1 connected in series with a current limiting resistor 72 and a diode 73 between the first stage secondary winding 65 and the gate 70 to trigger the first stage when the anode is positive with respect to the cathode. When the rectifier 66 is turned on or fired, it transmits power from the transformer winding 65, silicon rectifier 66, pulse transformer 67, the associated line 42 to matrix 40, through any of the associated closed switches 45 and associated diodes 46, the common transmission lines 44 to the matrix 41, through corresponding relay coils 47 and associated diodes 48 of matrix 41 to the transmission line 42 and thus back to the transformer winding 65. A current sustaining circuit 73*a* is connected across the above series circuit of stage 53 in parallel with the load circuit through matrices 40 and 41 and includes a diode 74 and a sustaining load resistor 75 connected in series. Thus, if all of the switches 45 of matrix 40 associated with line 42 of stage 53 are open, the rectifier would not fire when a pulse was applied to gate 70 in the absence of the sustaining load resistor 75. As noted, the rectifier 66 continues to conduct only during the positive half cycle of the alternating current voltage. During the opposite half cycle, the anode 68 becomes negative and the rectifier 66 automatically turns off as a result of its inherent and natural properties. The stopping of current flow in the first stage generates a triggering pulse in the pulse transformer 67 which is impressed on the gate 70 of the silicon controlled rectifier 66 of the second stage 54 and drives it into conduction, as subsequently described.

To prevent a subsequent triggering of stage 53 before the stages 54 through 60 have been fired, relay 71 has its coil 76 connected in a branch circuit 77 to be energized by the output of the first stage as follows. The branch circuit 77 includes coil 76 connected in series with a diode 78 between the connection of stage 53 to the associated ends of line 42 and thus in parallel with the sustaining load circuit 73*a* previously described. A capacitor 79 is connected in parallel with the relay coil 76 and is charged each time stage 53 is fired to a level which holds relay 71 energized and relay contacts 71–1 open. Thus, once the counter unit 43 is triggered, the start circuit is held open as long as the stages 53 through 60 are cyclically and sequentially fired.

The second and subsequent stages 54 through 60 are sequentially triggered, as follows.

Pulse transformer 67 of stage 53 includes a primary winding 80 which is serially connected with the rectifier 66. A diode 81 is connected in parallel with the primary winding 8. A secondary winding 82 is electromagnetically coupled to the primary winding 80 in a manner to generate a pulse sufficient to fire a rectifier 66 when the latter switches off. The secondary winding 82 of the first stage is connected in circuit with the gate 70 and cathode 69 of the silicon controlled rectifier 66 in the succeeding stage 54 by a diode 84 which is for the purpose of passing a positive voltage to the gate 70 with respect to the cathode 69 of the rectifier 66 in stage 54. The capacitor 83 is connected between the gate 70 and the cathode 69 of stage 54 to store the pulse signal until the voltage applied across the rectifier 66 is of sufficient magnitude to sustain conduction. The turn-on pulse to stage 54 thus coincides with the turning off of stage 53. As noted, stage 53 is turned off by the initial portion of the negative half cycle of the power appearing across secondary winding 65. The secondary winding 65 in the second stage 54 is oppositely wound with respect to the primary winding 62 such that what is a negative half cycle in stage 53 appears as a positive half cycle in stage 54. The polarity of the respective windings 65 and windings 82 at a given time are shown by the usual dot legends 85 adjacent the positive end of the winding. Therefore, the anode 68 of silicon controlled rectifier 66 in stage 54 is positive relative to the cathode 69 when a firing pulse is received from stage 53 for firing rectifier 66 to conduct and provide power to the associated discriminating transmission line 42 for transmitting a signal through any of the associated closed switches 45 and corresponding relay coils 47 during the corresponding positive half cycle. When the positive half cycle terminates, the silicon controlled rectifier 66 of second stage 54 turns off and triggers the third stage 55 which has its secondary winding 65 wound in the same manner as winding 65 of the first stage. The stages 53–60 will in this manner be sequentially fired. The last stage 60 has its pulse transformer 67 similarly coupled to the first stage 53 by means of wires designated X and X′, and Y and Y′ to recycle and start a new sequence through the counter. In this manner, each of the power stages is impressed upon the associated discriminating transmission lines 42 for application to the circuits through matrices 40 and 41, generally as broadly described with respect to the diagrammatic illustration of FIG. 1. For example, when a conventional 60 cycle power supply line is applied to the transformer 61, each half cycle will exist for a period of 1/120 of a second. Further, since there are eight sections or stages in the unit 43, each one stage will be energized or closed every 1/15 of a second. Power will then be impressed on the respective lines 42 and fed to any one relay coil 47 15 times per second if the associated switch 45 is closed. The holding capacitor 49 will store the pulse and maintain the associated coil 47 energized to hold the relay in as long as pulses are cyclically received. The ring counter unit 43 by the sequential application of power insures that at no time can a cross current be established between the power sources or winding 65 with a consequent erroneous energization of a relay coil 47.

The circuit of FIG. 2 also ensures against erroneous triggering of a counter stage in the unit by a transient signal or the like through a safety reset circuit 86 which includes relay 64 for controlling contacts 64–1 in the main power lines 63 to transformer 61. Generally, circuit 86 ensures that only a single count is circulated through the ring counter unit, in the following manner.

Circuit 86 includes the coil 87 of relay 64 in series with a potentiometer 88 and a diode 89 in parallel with the branch circuit 77. A capacitor 90 is connected in parallel with the relay coil 87. Each triggering of stage 53 impresses a pulse signal across the reset circuit 86, with the charging of capacitor 90 being determined by the setting of potentiometer 88. The latter is set such that two or more pulses must be received within the normal cycle time of unit 43 in order to charge capacitor 90 sufficiently to energize coil 87 to actuate and open contacts 64–1. If a single count is circulating through unit 43, capacitor 90 discharges during the time stages 54 through 60 are firing and the safety circuit 86 remains inactive. If two or more counts are circulating through the unit 43, at least two pulses are applied to capacitor 90 within one cycle period and relay 64 opens the associated contacts 64–1. This completely removes power from transformer 61 and therefore unit 43 and all stages 53 through 60 turn off. After a discharge time of capacitor 90, relay 64 drops out and contacts 64–1 close to again apply power to unit 43. Additionally, the disconnect relay 71 will have dropped out to close contacts 71–1 and complete the starting circuit between the anode 68 and gate 70 of rectifier 66 in the first stage 53. As a result, the unit 43 will begin anew with a single count passing therethrough.

The circuit of FIG. 2 thus provides a transmission system wherein sixteen wires 42 and 44 permit formation of sixty-four individual information channels. This system can be expanded by expansion of the matrices. For example, only twenty transmission wires or connecting lines interconnected and represented by a pair of matrices are needed to increase the capacity to one hundred information channels or circuit paths between related devices. Further, the system may employ similar electronic solid state components which are rugged, reliable and long life components. Although FIG. 2 has been described with control switches 45 at the field matrix 40 and relays 47 operating indicating lamps 52 at the control matrix 41, such devices are solely for explanation purposes and any other suitable electrical devices can be inserted into the circuit. Further, functions at the respective matrices can be interchanged; for example, with a portion of matrix 40 constituting a control unit for other devices in the matrix 41. As hereinafter described, a continuous modulation control system may be incorporated into a circuit of this invention.

Figure 3:
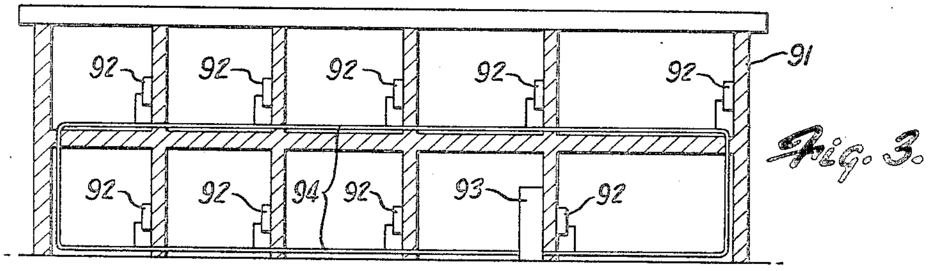
FIG. 3 is a diagrammatic illustration of the present invention applied to a control system, such as a temperature monitoring system, in a building.

Referring particularly to FIG. 3, an application of the present invention is diagrammatically shown as applied to a multiple room building 91, wherein signal information is to be transmitted between various locations 92 in the building and a central station 93. In accordance with the present invention, a single wiring loop 94, for example, consisting of 20 wires corresponding to wires 42 and 44 in FIG. 2 completely loops the building between the central station 93 and each of the sensing locations 92. The central station 93 includes a central matrix and a power source and discriminating unit, not shown, connected to the transmission lines of loop 94. Appropriate wires of loop 94 are removed at the sensing locations 92 and connected to suitable sensing units; for example, a switch 45 and an associated sensing device 50 as shown in FIG. 2. By looping the complete building, the several locations can transmit information to the central location to provide remote control and/or monitoring of the system.

Figure 4:
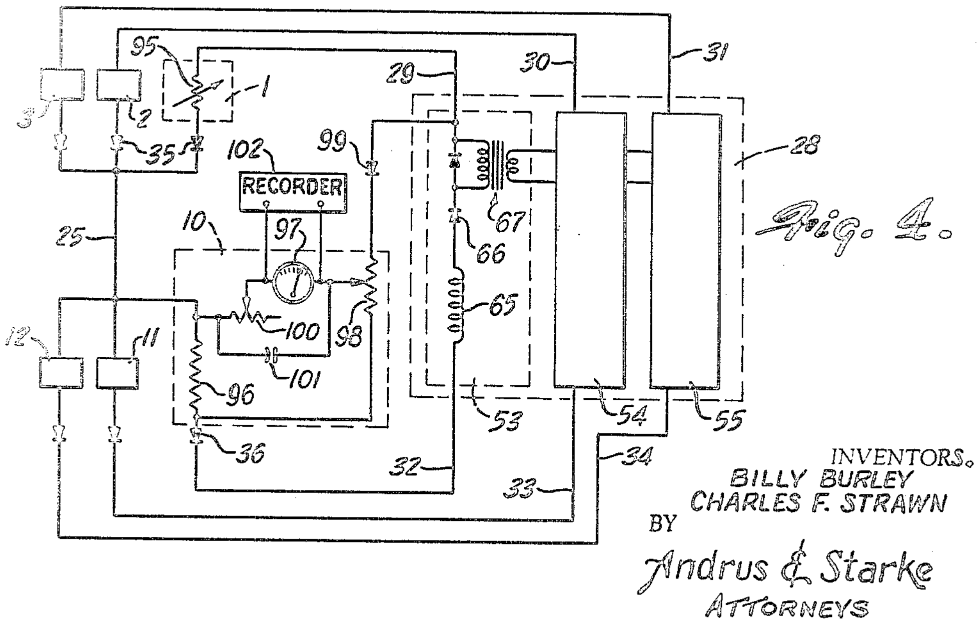
FIG. 4 is a schematic circuit diagram showing a portion of a circuit such as shown in FIGS. 1 and 2 and illustrating the present invention applied to an analogue transmission system.

Referring particularly to FIG. 4, an information transmission system generally similar to that of FIG. 1 is shown in which one of the multiple information channels is constructed to produce an analogue output signal. In FIG. 4, the power source and discriminating unit 28 is partially shown including a ring counter system such as shown in FIG. 2. Corresponding elements in FIGS. 1 and 4 are similarly numbered with the ring counter elements numbered in accordance with FIG. 2.

In FIG. 4, the paired devices 1 and 10 provide analogue transmission of a temperature or other condition which is sensed at device 1, a variable resistor 95 or similar responsive impedance. Thus, if a temperature condition is to be monitored, the resistor 95 has a given resistance at a selected temperature. As the temperature changes, the resistance and voltage drop across the resistor 95 varies accordingly. This results in a change in voltage drop at the device 10. In FIG. 4, the device 10 includes a a standard resistor 96 serially connected with the blocking diode 36. The change in voltage drop across the resistor 96 will be directly proportional to the change in the voltage drop across the variable resistor 95. A galvanometer 97 is connected across the standard resistor 96 for actuation in accordance with the variation. The galvanometer 97 is connected in circuit with the resistor 96 through a zero adjustment potentiometer 98 having its resistance element connected in series with a diode 99 between the positive side of the first stage 53 of the ring counter and the negative side of the standard resistor 96. The galvanometer 97 is connected to an adjustable tap of the potentiometer 98. The opposite side of the galvanometer 97 is connected in series with a span control rheostat 100 to the opposite side of the standard resistor 96. A holding or smoothing capacitor 101 is connected in parallel with the rheostat 100 and the galvanometer 97.

In operation, the circuit is set up with the variable resistor 95 at a selected reference temperature to establish a reference current through the information channel consisting of the variable resistor 95 and the standard resistor 96. Current passes from the first stage 53 of power source 29 through the diode 99, potentiometer 98 and diode 36 back to the first stage 53 of power source 28 to provide a balancing potential. The potentiometer 98 is preset to provide zero deflection of the galvanometer 97 with the circuit at a standard reference. During operation of the device, any change in the resistance of resistor 95 results in the corresponding change in the voltage drop across the standard resistor 96. This in turn will be reflected in the voltage applied across the galvanometer 97 and provide a corresponding deflection with respect to the zero setting to produce an analogue output. The galvanometer 97 may be connected to actuate a suitable recording device 102, shown in a block diagram, or a recording device can be substituted for the galvanometer, if so desired. Further, the analogue output signal can be interconnected to a temperature control unit to regulate the temperature of the atmosphere affecting the variable resistor 95; for example, the signal may control a valve or air damper of a suitable conditioning means.

Figure 5:
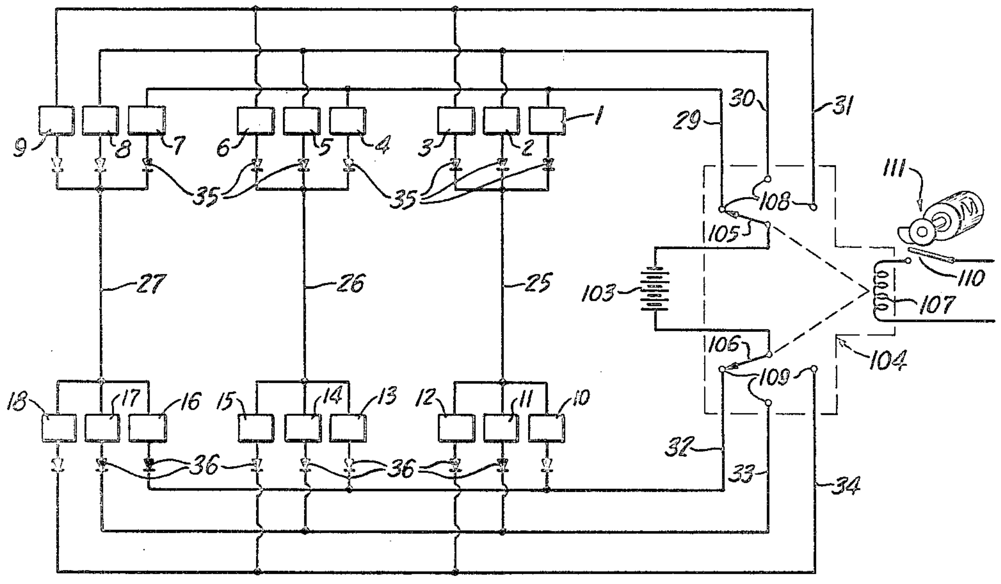
FIG. 5 is a view similar to FIG. 1 illustrating a single power source with a stepping switch means for sequentially connecting a power source to the individual transmission or circuit paths.

Referring particularly to FIG. 5, a further embodiment of the invention is schematically illustrated wherein a single power source 103 is selectively connected into the branch circuits. The circuit of FIG. 5 generally corresponds to the diagrammatic circuit illustration of FIG. 1 with only the first group of elements 1–3 and related elements 10–12 shown and corresponding elements therein are similarly numbered, except for the power source unit 28 and its connection into the circuits.

Referring particularly to FIG. 5, the power source is shown as a battery 103 for purposes of simplicity of illustration. A double-pole stepping switch 104 includes a pair of contact arms 105 and 106 which are coupled to an electromagnetic position winding 107 for synchronous and similar positioning with respect to corresponding sets of three contacts 108 and 109, respectively. Winding 107 is connected through a control switch 110 to a suitable source of power, not separately shown. Each closing and opening of the switch results in the energization and de-energization of the winding 107 with a consequent one-step movement of the contact arms 105 and 106. Therefore, cyclic actuation of the switch 109, for example, by a motor-driven cam unit 111, drives the stepping switch 103 to sequentially and cyclically move the contact arms 105 and 106 into engagement with the related or paired contacts of sets 108 and 109 in a cyclic manner. The contacts of the set 108 are connected to the connecting lines 29–31, the corresponding contacts of set 109 are connected to lines 32–34. The switch arms 105 and 106 sequentially and cyclically engage the corresponding contacts of sets 108 and 109 as a result of the periodic timed energization of the winding 107 to complete the three circuit paths. In this manner, the battery 103 or other suitable power source can be cyclically and sequentially interconnected in circuit with the several electrical signals and output means to provide discrimination in the same general manner as FIG. 2.

Figure 6:
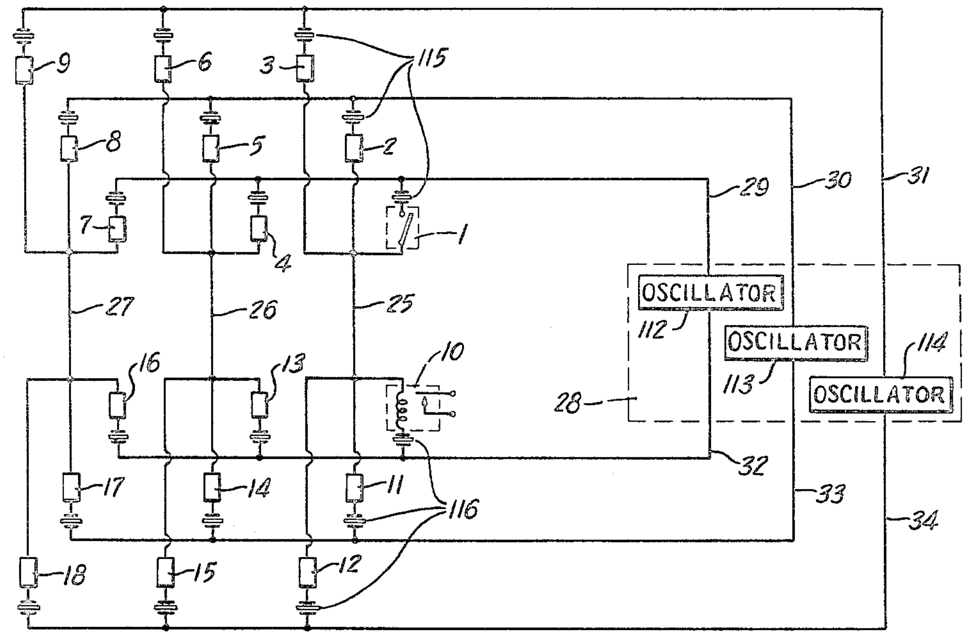
FIG. 6 is a view similar to FIG. 5 showing a frequency sensitive activating and discriminating circuit for paired electrical signal means.

Further, referring particularly to FIG. 6, a frequency discriminating circuit is shown for providing unique activation and discrimination of a plurality of the circuit paths between related signal means and output means. FIG. 6 generally corresponds to FIGS. 1 and 5 and corresponding elements in the circuit will be similarly numbered with the additional control elements employed specially described and numbered.

In FIG. 6, power sources 112, 113 and 114 are provided for the several related groups of the signal means and the output means with each of the power sources 112, 113 and 114 generating a unique frequency; for example, known oscillator circuits can be employed. In FIG. 6, band pass filters 115 are connected in series with the elements 1 through 9, inclusive, in place of the unidirectional current diodes 35. Corresponding band pass filters 116 are connected in the circuit of the output means or the related elements 10 through 18, inclusive. The filtering means 115 and 116 are shown as piezoelectric crystals although any other suitable filtering means can be employed which will pass the frequency of the corresponding power source and block substantially all other frequencies. A piezoelectric crystal provides efficient, reliable and long life filter units.

In operation the circuit generally corresponds to that previously described with respect to FIG. 1. For example, when switch 1 closes, a circuit is completed from the power source 112 through the related band pass filter or crystal 115, the now closed switching contacts 1, the common transmission line 25 to the output means 10 and the correspondingly related filter or crystal 116, back to the power source 112 via the line 32. The filters 115 in circuit with switches 2 and 3 prevent current feedback to the other lines even if the switches 2 and 3 are closed and filters 116 block the current in the line 25 from elements 11 and 12. As in the prior embodiments, the circuit thus provides a means for discriminating between related circuit paths. The circuit of FIG. 6 maintains continuous application of power to each of the circuit paths. One advantage of this is the reduction in the peak currents which must flow through the field wires to properly operate a load means such as a relay winding shown as a part of element 10. In certain analogue information systems, this would permit an accurate transmission of the signal and reduce the response time. However, the system of FIG. 6 requires somewhat greater costs because of the filter systems and unique power supplies required. The capacitive effect of the field lines or wires should also be considered for proper design.

Although particularly described with respect to an electrical system, the present invention can be adapted to pneumatic systems employing one-way valves and the like.

In summary, the present invention provides an information transmitting system for interconnecting a plurality of information channels or circuit paths with common transmission wires and connecting wires which substantially reduce the total wires required below that of the number of information channels. The system can be interconnected to provide essentially continuous indication and instantaneous control of all information channels without complicated and expensive components and control elements.

Various modes of carrying out the invention are contemplated as being within the scope of the following claims particularly pointing out and distinctly claiming the subject matter which is regarded as the invention.

We claim:

1. An information transmitting system, comprising
(a) a first plurality of electrical means,
(b) a second plurality of related electrical means spaced from said first plurality of electrical means,
(c) at least two groups of connecting lines defining a pair of matrices each having intersecting points corresponding at least to the number of electrical means in each of said pluralities and represented in rows and columns, one of said groups being common to the rows of the matrices and the other of said groups being common to the columns,
(d) first circuit means connecting the first plurality of electrical means between the intersecting lines at selected points in one of said matrices,
(e) second circuit means connecting the second plurality of electrical means between the intersecting lines at corresponding points in the other of said matrices thereby establishing circuit paths between the related electrical means, and
(f) means associated with the groups of connecting lines and the circuit means to operatively separate each of said circuit paths whereby power transfer between corresponding points of the matrices is exclusive of other points.

2. The transmitting system of claim 1 wherein the last named means includes first means in the circuit means to prevent feedback between the lines in one group at the several points of intersection in the corresponding matrix and means in the connecting lines to prevent connecting of the circuit paths in series and the power therebetween.

3. In a system of transmitting information between a plurality of paired electrical means divided into groups of paired electrical means,
(a) a first group of transmission lines, each of which forms a common circuit connection for a different group of the paired electrical means,
(b) a second group of transmission lines, each of which forms a common connection between one of each of the paired electrical means from each group connected by the first group of transmission lines,
(c) unidirectionally conducting elements connected in separate series circuit with the electrical means to the corresponding transmission lines, and
(d) control means to cyclically and sequentially close said second group of transmission lines to periodically complete the corresponding circuits to the connected paired electrical means.

4. The system of claim 3 wherein at least one paired electrical means includes,
(a) one electrical means to vary the current therethrough,
(b) a second electrical means to provide a related changing voltage signal, and
(c) an analogue responsive device connected across said second electrical means.

5. The system of claim 3 wherein the control means includes a ring counter having a switching stage in each of said second groups of transmission lines.

6. The system of claim 5 wherein said ring counter includes means to reset the counter if more than a single count is circulating therethrough.

7. An information transmitting system comprising
(a) a plurality of signal means,
(b) a plurality of output means associated respectively one each with said signal means,
(c) first means connecting said signal means in a plurality of groups, said connecting means including a plurality of correspondingly poled unidirectional conducting means connected in series with each of said signal means respectively and having one end connected to a common connection,
(d) second means connecting said output means in a similar number of groups in accordance with the groups of the corresponding signal means, said second connecting means including a plurality of correspondingly poled unidirectional conducting means connected in series with each of said output means respectively and having one end connected to a common connection,
(e) common conductor means connecting the common connection of each of the groups of said signal means solely with common connection of the corresponding group of said output means and the opposite ends of signal means to the corresponding output means, the unidirectional conducting means of both groups being connected to have the same relative polarity, and
(f) activating means including at least one power source connected in said conduction means for establishing power in each group different than the power in any other group for activating selected signal means and the output means associated therewith.

8. Apparatus as defined in claim 7 wherein said activating means comprises a single power source, and sequencing means for connecting said source with successive groups of said signal means and the output means associated therewith.

9. Apparatus as defined in claim 7 wherein said activating means comprises a plurality of power sources connected one each to the groups of the signal means and the corresponding output means.

10. Apparatus as defined in claim 9 wherein said activating means further includes means successively connecting said power sources with the respective signal generating and output means.

11. Apparatus as defined in claim 10 wherein said power sources comprise a plurality of voltage sources and further wherein said successive connecting means comprises ring counter means having a plurality of stages connected with said voltage sources respectively.

12. An information transmitting system comprising (a) a plurality of signal means, (b) a plurality of output means associated respectively with said signal means, (c) first means connecting equal numbers of said signal means in a plurality of first groups, said connecting means including a plurality of correspondingly poled unidirectional conducting means connected in series with each of said signal means respectively.

(d) second means connecting said output means in a number of second groups corresponding with the groups of said signal means, said second connecting means including a plurality of correspondingly poled unidirectional conducting means connected in series one each with each of said output means respectively, (e) common conductor means connecting each of the groups of said signal means solely with the corresponding group of said output means, the unidirectional conducting means of both groups being connected to have the same relative polarity, (f) a plurality of power sources corresponding in number to the number of means in each of said groups, each of said power sources being associated with a different signal means in each of the groups thereof and with a corresponding output means in each of the groups thereof, and (g) means successively connecting said power sources respectively with the signal means and output means associated therewith.

13. Apparatus as defined in claim 12 wherein said first and second connecting means comprise remote and central matrices respectively wherein said power sources comprise voltage sources and wherein said power source successive connecting means comprises ring counter means having a plurality of stages connected in series with said voltage sources respectively.

14. In an information transmission system for transmitting information from first groups of electrical means to second related groups of electrical means, (a) circuit means connecting the electrical means in each group in different circuit paths connected in common at one end and open at the opposite end and each path including a diode, the diodes in the first group being poled to conduct to the common connection and in the second group being poled to conduct from the common connection.

(b) a first plurality of transmission lines connected one each to each of the common connections of related groups, (c) a second plurality of transmission lines connecting the open ends of electrical means in the related groups to form information channels, (d) alternating current power means connected in the second plurality of transmission lines, (e) silicon controlled rectifiers connected one each in series with the power means and poled to conduct in the same direction as the related diodes and each having a control electrode, (f) pulse forming means connecting the output of one silicon controlled rectifier to an input of another silicon controlled rectifier to form an electronic ring counter, (g) a self-generating firing circuit connected to only one of said silicon controlled rectifiers, and (h) a reset circuit connected to the output of only one of said silicon controlled rectifiers to momentarily remove power from each silicon controlled rectifier if the associated rectifier is fired more than once in a selected time period.

15. In an information transmission system for transmitting information from first groups of electrical means to second related groups of electrical means, (a) circuit means connecting the electrical means in each group in different circuit paths connected in common at one end and open at the opposite end and each path including a diode, the diodes in the first group being poled to conduct to the common connection and in the second group being poled to conduct from the common connection, (b) a first plurality of transmission lines connected one each to each of the common connections of related groups, (c) a second plurality of transmission lines connecting the open ends of electrical means in the related groups to form information channels, (d) alternating current power means connected in the transmission lines to provide power to said electrical means, (e) silicon controlled rectifiers connected one each in series with the power means and poled to conduct in the same direction as the related diodes and each having a control electrode, (f) means connecting the output of one silicon controlled rectifier to an input of another silicon controlled rectifier to form an electronic ring counter, (g) a self-generating firing circuit connected to the input of a first of said silicon controlled rectifiers, (h) a disconnect circuit coupled to the output of the first of said silicon controlled rectifiers and energized by the sequential timed firing thereof to hold the self-generating firing circuit open, and (i) a reset circuit connected to the output of the first of said silicon controlled rectifiers to momentarily remove power from each silicon controlled rectifier if the associated rectifier is fired more than once in a selected time period.

16. The information transmission system of claim 15 wherein the disconnect circuit and the reset circuit comprise, (a) a pair of paralleled control capacitors charged by the output of the associated silicon controlled rectifier, and (b) an adjustable resistor in the circuit of the capacitor forming a part of the reset circuit to adjust the time constant of the reset circuit.

17. An information transmitting system comprising (a) a plurality of signal means, (b) a plurality of output means associated respectively one each with each of said signal means, (c) first means connecting said signal means in a plurality of groups, said connecting means including a plurality of frequency sensitive means connected in series with each of said signal means respectively and having one end connected to a common connection for each group, (d) second means connecting said output means in a similar number of groups in accordance with the groups of the corresponding signal means, said second connecting means including corresponding frequency sensitive means connected in series with each of said output means respectively and having one end connected to a common connection for each group, (e) common conductor means connecting the common connection of each of the groups of said signal means solely with the common connection of the corresponding group of said output means, and (f) a plurality of voltage sources corresponding to the number of signal means in the largest group and each having a different electrical output frequency and each being connected to only one of the signal means and the corresponding output means in each of said groups, said frequency sensitive means responding only to the frequency of the source connected to the corresponding signal means.

18. Apparatus as defined in claim 17 wherein said frequency sensitive means are filter means responsive to said different frequencies.

19. A system for transmitting information in the form of signals between a plurality of electrical devices, comprising (a) a first group of transmission lines, (b) a second group of transmission lines, (c) a first plurality of electrical devices, each being connected at one end to a different one of said first group of transmission lines and at the opposite end to a first common line of said second group of transmission lines, (d) a second plurality of electrical devices, each being connected to the opposite end of a different one of said first group of transmission lines and thereby related to a particular one of said first plurality of electrical devices and at the opposite end to said first common line, (e) a third plurality of electrical devices connected to the same transmission lines of said first group of transmission lines as said first plurality of electrical devices and to a second common line of said second group of transmission lines, (f) a fourth plurality of electrical devices connected to the opposite end of the same transmission lines of said first group of transmission lines as said third plurality of electrical devices and thereby related to particular ones of said third plurality of electrical devices and at the opposite end to said second common line, and (g) means associated with one of said groups of transmission lines and said electrical devices to establish exclusive signal circuit paths for each of the related electrical devices.

20. The system of claim 19 wherein said last-named means comprises, (a) unidirectional conducting means connected one each with each of said electrical devices between the connections to said transmission lines, and (b) sequencing means connected in said one group of transmission lines to sequentially apply power to said lines.

21. The system of claim 20 wherein said sequencing means includes means to cyclically and sequentially complete said one group of transmission lines to periodically complete the circuit to the related electrical devices.

22. The system of claim 21 wherein the sequencing means includes, (a) power sources serially connected one each in the second group of transmission lines, and (b) silicon controlled rectifiers connected in series with the power sources and interconnected as a ring counter to sequentially trigger said rectifiers.

23. The system of claim 22 having means responsive to the firing of one of said rectifiers to reset the ring counter if the corresponding rectifier is fired more than once in a selected time period.

References Cited

UNITED STATES PATENTS

| | | | |
|---|---|---|---|
| 3,201,754 | 8/1965 | Reiner et al. | 340—147 |
| 3,273,128 | 12/1966 | Ruthazer. | |
| 3,065,462 | 11/1962 | Maltby et al. | 340—413 |
| 3,166,741 | 1/1965 | Spence | 340—413 |
| 3,217,185 | 11/1965 | Jansons | 307—88.5 |
| 3,229,276 | 11/1966 | Harple et al. | 340—181 |

OTHER REFERENCES

"Frequency-Code," H. B. Schultheis, Jr., Electronics, April 1954, pp. 172–176.

JOHN W. CALDWELL, *Primary Examiner.*

D. YUSKO, *Assistant Examiner.*